(12) United States Patent
Mathew et al.

(10) Patent No.: US 6,357,763 B2
(45) Date of Patent: *Mar. 19, 2002

(54) SEAL FOR LCD DEVICES AND METHODS FOR MAKING SAME

(75) Inventors: Ranjan J. Mathew, San Jose; Boonmi Mekdhanasarn, Sunnyvale, both of CA (US)

(73) Assignee: National Semiconductor Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/186,297
(22) Filed: Nov. 4, 1998
(51) Int. Cl.[7] .................................................. G02F 1/13
(52) U.S. Cl. ........................ 277/628; 349/155; 349/190; 277/233; 350/160
(58) Field of Search ................................ 277/939, 628, 277/233, 931, 654, 650, 941, 942; 349/190, 155; 350/160

(56) References Cited

U.S. PATENT DOCUMENTS

| | | | | |
|---|---|---|---|---|
| 3,939,556 A | * | 2/1976 | Borel et al. .................. 29/592 |
| 4,023,259 A | * | 5/1977 | Kubota et al. ................ 29/592 |
| 4,037,930 A | * | 7/1977 | Matsuyama ............. 350/160 C |
| 4,050,786 A | * | 9/1977 | Feldmen .................. 350/160 C |
| 4,165,157 A | * | 8/1979 | Kobale et al. ............... 350/343 |
| 4,308,442 A | * | 12/1981 | Sallin et al. ............. 219/10.43 |
| 4,470,668 A | * | 9/1984 | Inoue et al. ................. 350/343 |

* cited by examiner

*Primary Examiner*—Anthony Knight
*Assistant Examiner*—Mark Williams
(74) *Attorney, Agent, or Firm*—Beyer Weaver & Thomas, LLP

(57) ABSTRACT

The present invention provides an improved seal for sealing a liquid crystal display (LCD) device. An improved seal is formed between a transparent plate and a die having a pixel array. The improved seal is configured to encircle the pixel array of the die when the die and the transparent plate are joined. The die and the transparent plate are joined together such that the improved seal is disposed between the transparent plate and the die. In one embodiment, the improved seal is a hybrid seal. The hybrid seal includes a first seal encircling the pixel array of the die and adhesively coupling the transparent plate and the die. The hybrid seal further includes a second seal encircling the second seal. In another embodiment, the first seal lacks a characteristic necessary for an effective seal. The second seal possesses the characteristic, such that the hybrid seal possesses the necessary characteristic.

12 Claims, 6 Drawing Sheets

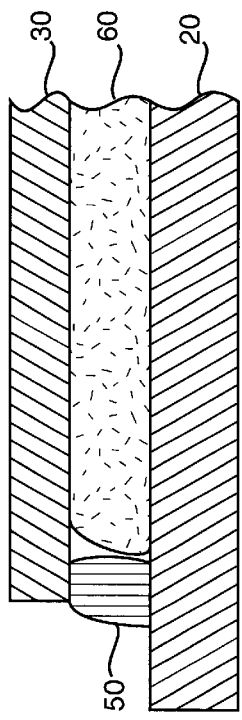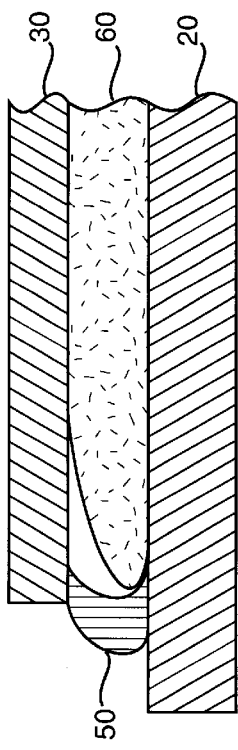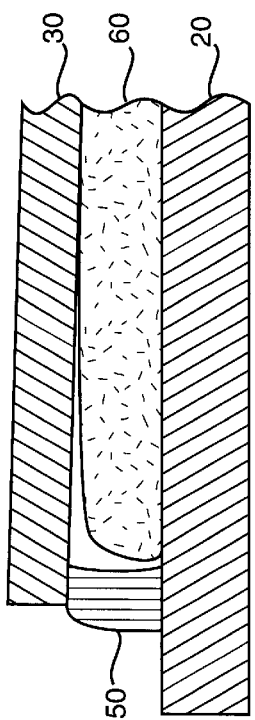
FIG. 2 PRIOR ART
FIG. 3 PRIOR ART
FIG. 4 PRIOR ART

US 6,357,763 B2

SEAL FOR LCD DEVICES AND METHODS FOR MAKING SAME

BACKGROUND OF THE INVENTION

The present inventions relate generally to liquid crystal displays (LCDs). More specifically to methods and apparatuses for sealing LCD devices.

Today, small scale LCD devices, such as light valves are becoming more prominent. Small scale LCD devices, and light valves are typically manufactured according to certain specifications to ensure that they function properly. One criteria is that the pixel array is appropriately sealed to prevent contamination and ensure proper operation.

Referring to FIG. 1, a typical small scale LCD device 10 includes a die 20 containing a pixel array 22. Pixel array 22 is typically composed of rows and columns of electrically conductive pathways. At the intersection of a row and a column of the electrically conductive pathways is a pixel. Each pixel can be turned on individually by selecting the appropriate row and column of pixel array 22. Selection of a pixel is controlled by control circuitry, either included within the die 20 or external to the die 20. In both cases, external control signals may be used to control the functions of the die 20. Bond pads 25, are usually placed around pixel array 22, and typically connected to the pixel array 22 to allow control of the operation of the pixel array 22.

Bond pads 25 are electrically coupled to pixel array 22 by circuitry that is normally internal to the die 20. A glass plate 30 is typically placed over die 20 and pixel array 22, such that the glass plate 30 overhangs the die 20, and may cover an area of die 20 that could have contained bond pads 25. The placement of bond pads 25 are often concentrated to one or two sides of die 20, such that the glass plate 30 does not cover the bond pads 25.

Die 20 is typically mounted to a substrate 80. Substrate 80 includes a plurality of substrate pads 85. Bond pads 25 typically are wire bonded to the substrate pads 85 by bonding wires 90.

Typically, an adhesive seal 50 is formed between glass plate 30 and die 20 and surrounding pixel array 22. The sealed area between glass plate 30 and pixel array 22 is commonly filled with a solution of liquid crystal materials 60. After die 20 is properly affixed with glass plate 30, die 20 is attached and coupled to substrate 80, and sealed. Seal 50 contains the liquid crystal material 60 from leaking.

In typical LCD devices seal 50 often times does not maintain its integrity, which causes deformation and irregularities in the LCD devices. The failure of seal 50 to adequately adhere glass plate 30 to die 20 may cause artifacts 70. The artifacts may extend into the active area of the pixel array, causing visual aberrations in the final LCD device. Such artifacts render the LCD device defective.

FIGS. 2, 3 and 4 illustrate cross-sectional views of an LCD device 12. The cross-sections depict a glass plate 30 bonded to a die 20 by a seal 50. The interior is filled with liquid crystal material 60.

FIG. 2 illustrates the initial shape of seal 50 immediately after glass plate 30 is attached to die 20. Seal 50 sufficiently contains liquid crystal material 60. During the process of handling LCD device 12 many factors contribute to the deformation of seal 50, and LCD device 12 itself.

After glass plate 30 is attached to die 20 and LCD device 12 is filled with liquid crystal material 60 further processing steps require handling the LCD device 12. For example, the LCD device 12 is placed on a substrate (such as substrate 80 of FIG. 1). Also, LCD device 12 is subjected to functional testing. During these processing steps, LCD device 12 may undergo temperatures and stresses that may cause seal 50 to deform.

Referring to FIG. 3, many seals do not maintain their integrity during handling and/or testing of the LCD device. In typical LCD devices seal 50 is tensile. That is, seal 50 has a tendency to expand. The tensile nature of 50 becomes more troublesome during the heating and handling of the LCD device.

As illustrated, a common problem of the tensile nature of seal 50 is the delamination of liquid crystal material 60 from glass plate 30. Heating and/or handling of the LCD device may cause thermal excursion of the liquid crystal material. The liquid crystal material will typically tend to expand. Due to the tensile nature of seal 50, seal 50 may not contain the expanding liquid crystal material and expand outward, as illustrated. The liquid crystal material delaminates from the glass plate because the seal does not prevent the thermal excursion of the liquid crystal material.

A similar problem that causes artifacts in the LCD device is the deformation of the glass plate and/or the die. FIG. 4 illustrates a LCD device 12 with a deformed glass plate 30. Glass plate 30 (or die 20) may deform or bow during heating and/or handling of the LCD device. The deformation often times causes the glass plate to separate from the liquid crystal material 60. Again, seal 50 may not prevent the problem due to its tensile nature. The delamination of the glass plate from the liquid crystal material similarly causes artifacts in the LCD device that may render the device defective.

Therefore, current methods of sealing a LCD device may not sufficiently prevent delamination of the glass plate from the liquid crystal material. A seal that is capable of preventing the delamination of liquid crystal material from the glass plate is desired.

SUMMARY OF THE INVENTION

The present invention provides an improved seal for sealing a liquid crystal display (LCD) device. An improved seal is formed between a transparent plate and a die having a pixel array. The improved seal is configured to encircle the pixel array of the die when the die and the transparent plate are joined. The die and the transparent plate are joined together such that the improved seal is disposed between the transparent plate and the die.

In one embodiment, the improved seal is a hybrid seal. The hybrid seal includes a first seal encircling the pixel array of the die and adhesively coupling the transparent plate and the die. The hybrid seal further includes a second seal encircling the second seal.

In another embodiment, the first seal lacks a characteristic necessary for an effective seal. The second seal possesses the characteristic, such that the hybrid seal possesses the necessary characteristic.

These and other advantages of the present inventions will become apparent to those skilled in the art upon a reading of the following descriptions of the invention and a study of the several figures of the drawing.

BRIEF DESCRIPTION OF THE DRAWINGS

FIG. 2 illustrates a LCD device with a seal immediately after a glass plate is attached to a die.

FIG. 3 illustrates the LCD device of FIG. 2 with the liquid crystal material delaminating from the glass plate.

FIG. 4 illustrates the LCD device of FIG. 2 with a deformed glass plate.

DETAILED DESCRIPTION OF THE PREFERRED EMBODIMENTS

The present invention provides an improved seal for use in LCD devices. The seal more effectively resists the effects of thermal excursion of liquid crystal material within an LCD device, thereby preventing artifacts. In one embodiment, a hybrid seal is utilized to provide a compressive seal that is better able to contain the liquid crystal material. In alternate embodiments, hybrid seals are utilized to meet all the necessary requirements of an effective seal.

Conventional seals may exhibit tensile behavior because a single sealant material may not meet all the criteria of an adequate seal. Among the criteria, a seal should (1) not react with the liquid crystal material; (2) have a high glass transition temperature (the temperature at which the sealant becomes fluid); (3) provide an effective barrier against humidity; (4) curable at a low temperature such that heating does not cause the liquid crystal material to deteriorate; and (5) prevent the delamination of the liquid crystal material.

Often times a single material may not be able to meet even these limited number of criteria. A single sealant may meet one or more of the criteria, but not all the criteria. Thus, conventional sealants have typically lacked the ability to prevent the delamination of the liquid crystal material in order to meet some of the other criteria.

However, the present invention provides an effective seal without compromising on any of the criteria. In one embodiment of the present invention, a hybrid seal is utilized to provide an effective seal. A hybrid seal is comprised of two sealants. A first seal provides one or more of the features of an effective seal and a second seal provides any other criteria not met by the first seal.

Figure 1:
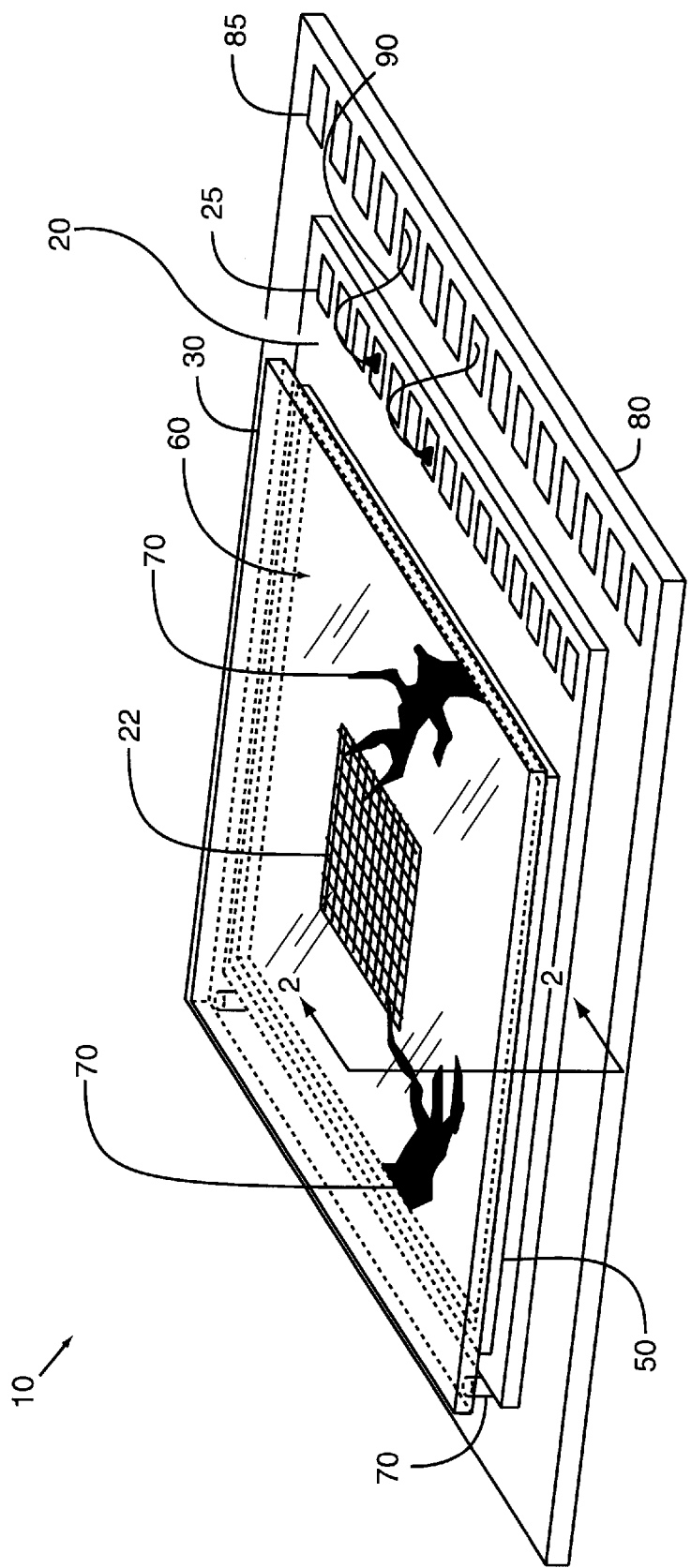
FIG. 1 illustrates a typical small scale LCD device.
Figure 5:
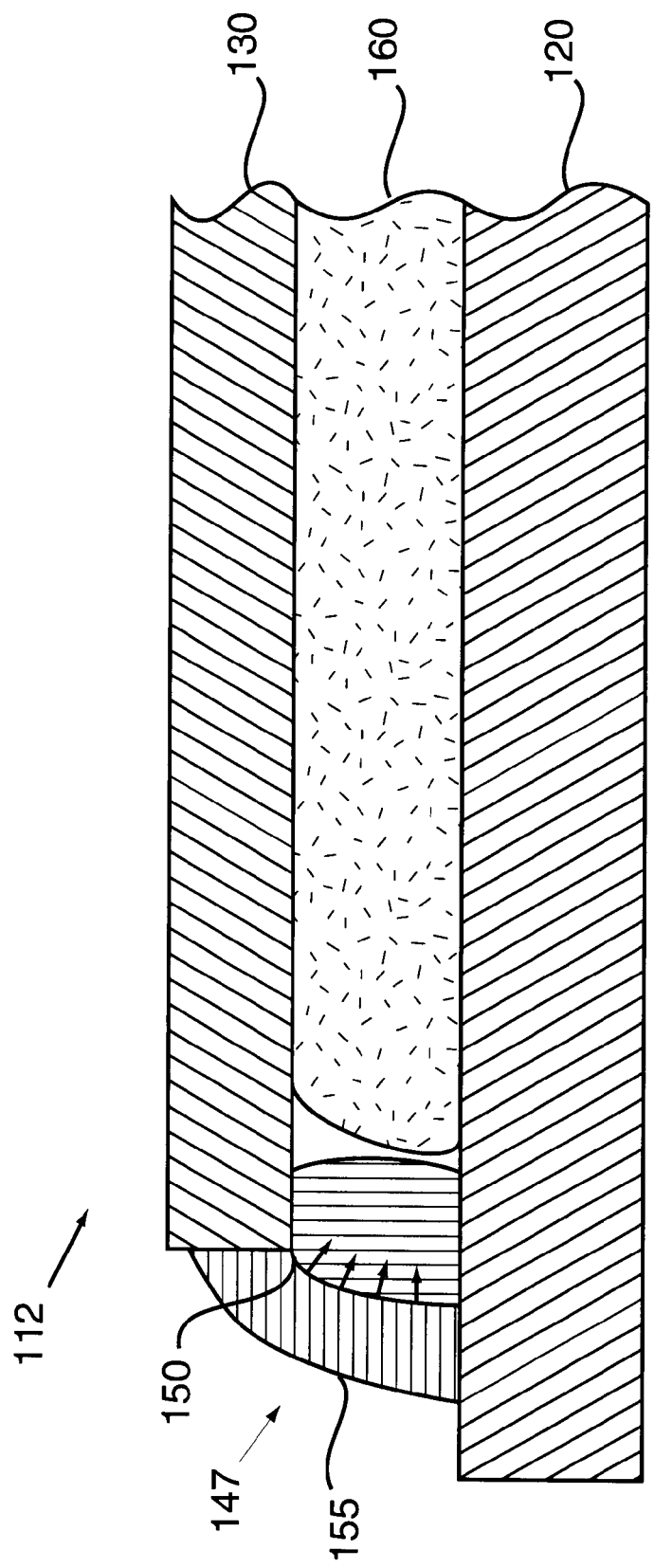
FIG. 5 illustrates a LCD device with an improved seal in accordance with an embodiment of the present invention.

FIG. 5 illustrates an LCD device 112 with an improved seal in accordance with an embodiment of the present invention. LCD device 112 includes a transparent plate 130 and a LCD die 120. A hybrid seal 147 seals the perimeters of transparent plate 130 and die 120, enclosing liquid crystal material 160.

Hybrid seal 147 includes a first seal 150 and a second seal 155. In one embodiment, the first seal 150 is a conventional type of seal that is not reactive with the liquid crystal material and provides an effective barrier against humidity. However, the first seal may also exhibit tensile behavior during heating and/or handling. Second seal 155 provides a compressive seal that has a tendency to compress the first seal 150 when heated, to prevent the first seal from expanding.

The first seal 150 is placed immediately surrounding the liquid crystal material. The second seal 155 provides an additional seal in order to remedy any deficiencies of the first seal. Since the second seal does not contact the liquid crystal material the second seal need not be unreactive with the liquid crystal material. The exclusion of that criteria creates more alternatives for the selection of the material of the second seal.

In the illustrated embodiment, the second seal provides a compressive seal that maintains the integrity of the hybrid seal. During heating and/or handling the second seal prevents the first seal from expanding. In turn, the liquid crystal material is prevented from delaminating from the transparent plate through thermal excursion.

Also, the second seal helps to prevent the transparent plate and/or the die from bowing or deforming. Since the second seal is compressive, the second seal exerts greater adhesive forces on the transparent plate and the die. The adhering force helps to prevent bowing and deformation.

Thus, a hybrid seal may be used to provide an effective seal that meets all the necessary criteria. The use of different sealants provides greater flexibility in the selection of the materials of the sealants. No one seal need meet all the necessary criteria since any deficiency may be remedied by the other seal.

While the illustrated embodiment focuses on the tensile/compressive aspect of a seal, the present invention applies to the other criteria of a seal. By way of example, one seal may react with the liquid crystal material, have a low glass transition temperature or ineffective against humidity. The other seal may adequately provide the needed attribute. Among some of the criteria, desireable aspects of the hybrid seal includes in one embodiment, a low curing temperature of about less than 70° C., and a glass transition temperature greater than about 70.

Of course, the placement of the seal also dictates which one of the criteria the seals may lack. For example, the first (inner) seal should always be non-reactive with the liquid crystal material since the first seal directly contacts the liquid crystal material.

Ideally both seals should have a low curing temperature. However, the second (outer) seal may have a higher curing temperature than the first seal since the second seal is not located directly adjacent to the liquid crystal material. Further, the present invention is not limited to just two seals. Any number of seals may be used to provide a hybrid or composite seal that meets all the necessary requirements of a seal. Thus, the outermost seals, furthest from the liquid material, may have significantly higher curing temperatures.

FIG. 5 illustrates an embodiment of the present invention with a hybrid seal placed at the very periphery of transparent plate 130. However, the hybrid seal may be placed at any suitable location around the pixel array of LCD die 120.

Figure 6A:
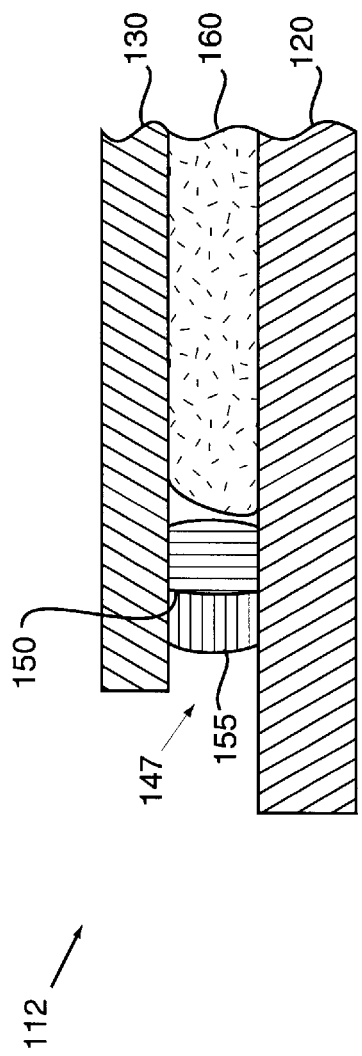
FIG. 6a illustrates a LCD device with a hybrid seal in accordance with another embodiment of the present invention.

FIG. 6a illustrates a LCD device with a hybrid seal in accordance with another embodiment of the present invention. The LCD device includes a hybrid seal 147 that is placed within the circumference of transparent plate 130.

Figure 6B:
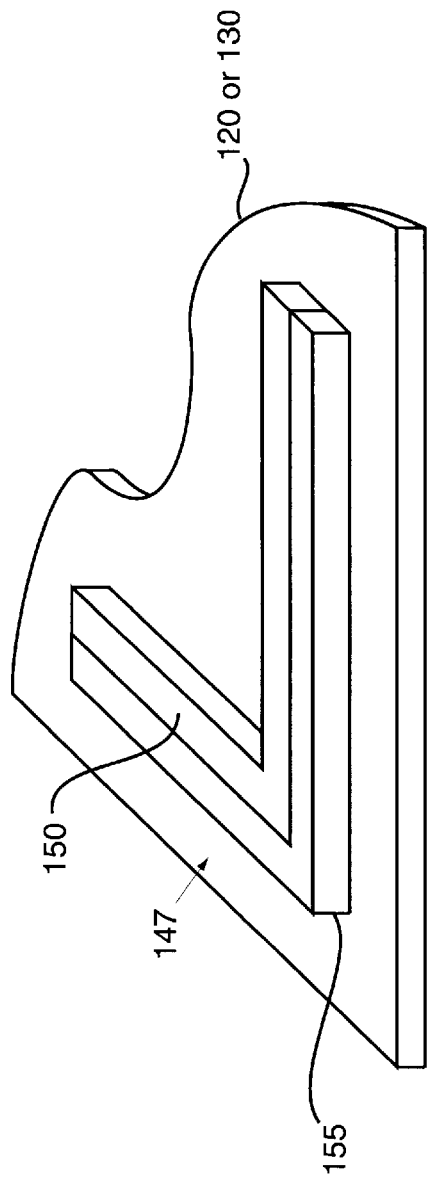
FIG. 6b illustrates the placement of a hybrid seal in accordance with an embodiment of the present invention.

FIG. 6b illustrates the placement of a hybrid seal in accordance with an embodiment of the present invention. In one embodiment, second seal 155 is placed directly surrounding first seal 150 within the perimeter of the transparent plate 130 or die 120 before the transparent plate and die are attached together. In alternate embodiments, the seals need not be physically in contact with each other upon application. The seals may be comprised of epoxy-like materials that expand when the transparent plate is attached to the die.

Seals 150 and 155 may be comprised of any suitable types of material so long as the combination of the seals provides an effective seal within an LCD device. By way of example, Three Bond 51, 96, 98 and 184 by the Three Bond Corporation; Norland 68 by the Norland Corporation; Silicone E 17303 by the General Electric Corporation; and Loctite 395 by Loctite, Inc., may be utilized in accordance with the present invention.

Combinations of the sealants may be used to provide a more effective seal than only using a single material. In one embodiment, a first seal comprised of Three Bond 51 and a second seal comprised of Three Bond 184 provides a superior seal.

The present invention may be used in combination with a variety of suitable liquid crystal materials. By way of example, polymer dispersed liquid crystals, twisted-newmatic liquid crystals or ferroelectric.

Figure 7:
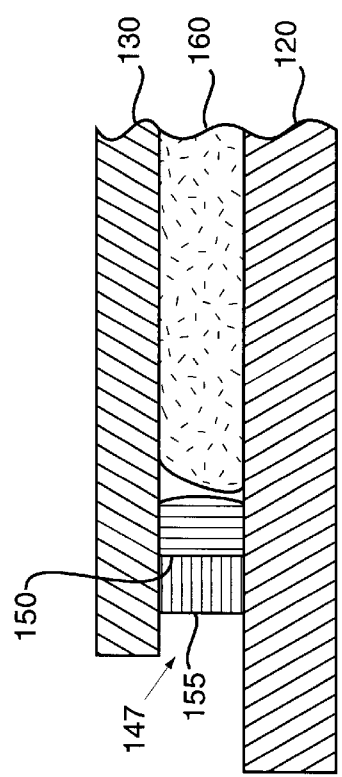
FIG. 7 illustrates a hybrid seal in accordance with an embodiment of the present invention.

However, the present invention is not limited to amorphous materials for use as a sealant. FIG. 7 illustrates a hybrid seal 147A in accordance with another embodiment of the present invention. Hybrid seal 147A includes a first seal 150 that is comprised of conventional sealant materials, such as those listed above. Second seal 155, on the other hand, formed from fusible material, such as a solder. Fusible seals are discussed in further detail in U.S. patent application Ser. No. 09/056,165, entitled "FUSIBLE SEAL FOR LCD DEVICES AND METHODS FOR MAKING SAME" by Ranjan J. Mathew and Hem P. Takiar, filed Apr. 6, 1998, which is incorporated herein by reference.

The fusible seal 155 provides even further structural stability to the LCD device. The structural characteristics of the fusible seal prevents any deformation of the first seal, thus preventing delamination of the liquid crystal material. Further, fusible seal 155 provides a good barrier against humidity and has a high glass transition temperature. While a fusible seal may require a higher curing temperature, localized fusing of the fusible seal, as discussed in the above-referenced application, may be utilized. Localized heating may also be used in conjunction with more conventional sealant materials.

Figure 8:
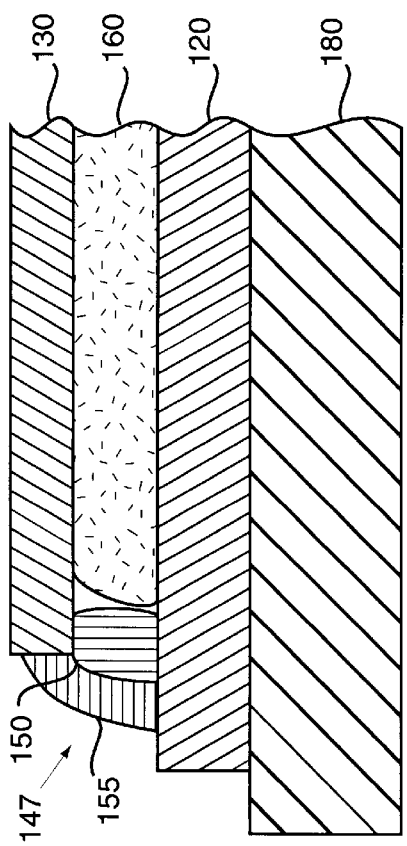
FIG. 8 illustrates a mounted LCD device in accordance with an embodiment of the present invention.

After the transparent plate and the die are properly sealed with a hybrid seal, the LCD device may be mounted on a substrate. FIG. 8 illustrates a mounted LCD device 110 in accordance with an embodiment of the present invention. Mounted LCD device 110 includes the LCD device 112 of FIG. 5 attached to a substrate 180.

The effects of heating and warping may be further alleviated by processing the LCD device after being mounted on a substrate. Any suitable substrate material may be utilized in accordance with the present invention. By way of example, aluminum, silicon, alumina (ceramic) and aluminum nitride may be used. In one embodiment an aluminum substrate adds further stability to hybrid seal 147 during heating and/or handling.

In another embodiment a cavity is formed within the substrate. The cavity helps to provide greater stability and prevents warping of the LCD device. The use of substrates and substrates with cavities are discussed in further detail in U.S. patent application Ser. No. 09/130,631, entitled "LIQUID CRYSTAL DISPLAY ASSEMBLY AND METHOD FOR REDUCING RESIDUAL STRESSES" by Ranjan J. Mathew and Seshadri Vikram, filed Aug. 6, 1998, which is incorporated herein by reference.

In addition to placing the LCD device on a substrate, another seal may be applied to the LCD device. In conventional LCD devices a glob coating is placed around the transparent plate and over the LCD die and substrate. The glob coating also covers the bond pads of the LCD die and the substrate pads of the substrate. The glob coating is typically applied after all functional testing and handling has been completed since the glob coating prevents such activities.

Rather than placing a glob coating over the entire LCD device and substrate without covering the transparent plate, another seal may be formed around the periphery of the transparent plate. The extra seal may be placed about the periphery of the transparent plate without interfering with any of the functional elements of the LCD device, such as the bond and substrate pads.

Figure 9:
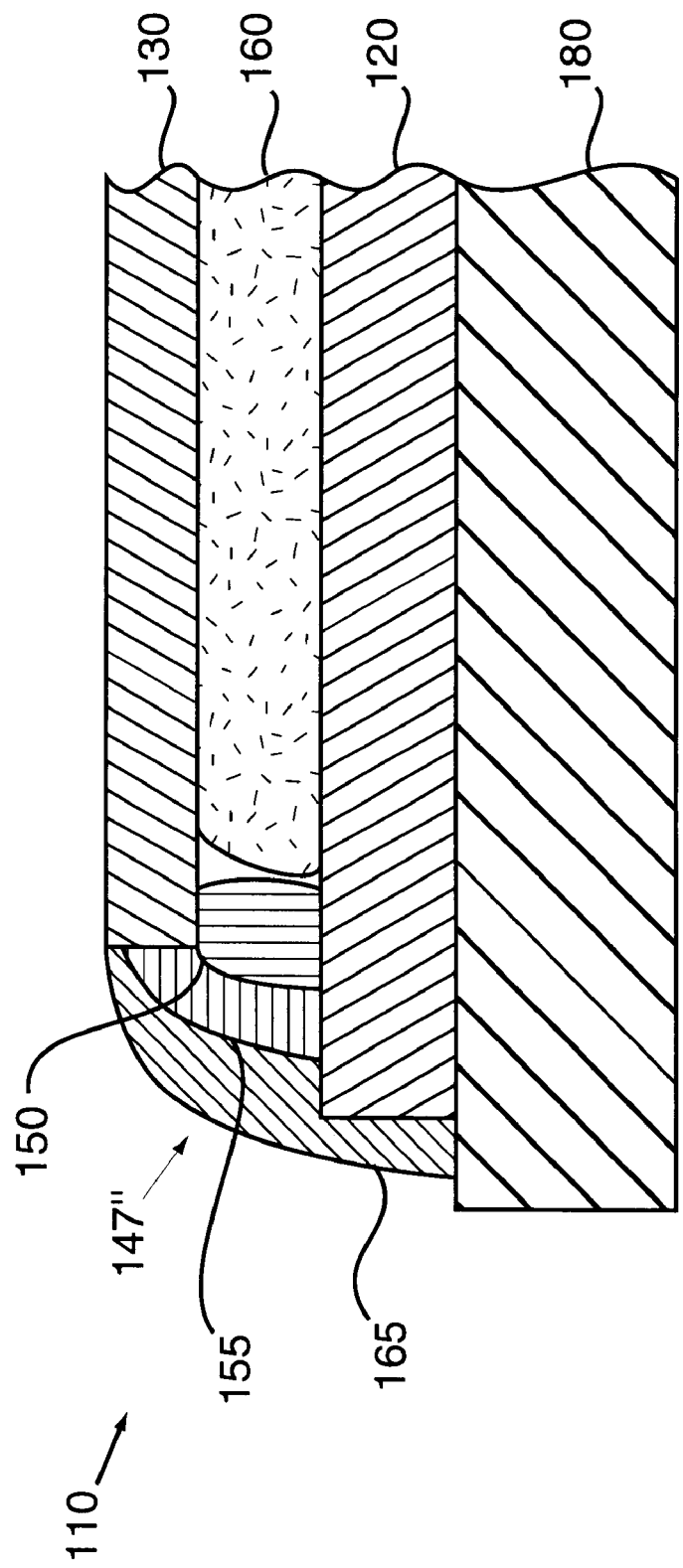
FIG. 9 illustrates a LCD device in accordance with an embodiment of the present invention.

FIG. 9 illustrates a LCD device in accordance with an embodiment of the present invention. The LCD device includes a hybrid seal 147AA, which has a first seal 150, a second seal 155 and a third seal 165. The third seal may be comprised of typical sealant materials, as discussed above, or materials typically used for glob coating. By way of example, third seal may be comprised of ultraviolet curable and thermally curable silicones or epoxies. The third seal adds further structural stability to the hybrid seal. The third seal also prevents significant warping of the transparent plate and the LCD die.

Thus, a hybrid seal may be utilized to remedy many deficiencies in conventional single material seals used in LCD devices. Hybrid seals provide added flexibility in the selection and use of existing materials rather than spending additional time and money to produce a single material sealant that meets all the requirements of an effective seal. Hybrid seals can meet all the requirements without extra cost in terms of development.

While this invention has been described in terms of several preferred embodiments, it is contemplated that alternatives, modifications, permutations and equivalents thereof will become apparent to those skilled in the art upon a reading of the specification and study of the drawings. It is therefore intended that the following appended claims include all such alternatives, modifications, permutations and equivalents as fall within the true spirit and scope of the present invention.

What is claimed is:

1. A compressive seal which adhesively couples a transparent plate and a die of a liquid crystal display assembly, and seals and contains a quantity of liquid crystal material disposed between the transparent plate and the die, the compressive seal comprising:

a compressible first adhesive sealant disposed substantially peripherally around the liquid crystal material between the transparent plate and the die of the liquid crystal display assembly, said first adhesive sealant being substantially non-reactive with said liquid crystal material; and a second adhesive sealant disposed substantially peripherally around said first adhesive sealant and adapted to compress the first adhesive sealant and the quantity of liquid crystal material between the transparent plate and the die when said second adhesive sealant is exposed to heat, wherein said second adhesive sealant substantially prevents said first adhesive sealant from expanding such that contact of the liquid crystal material with both the transparent plate and the die is maintained.

2. The compressive seal of claim 1, wherein the first adhesive sealant serves as a barrier between the second adhesive sealant and the quantity of liquid crystal material.

3. The compressive seal of claim 2, wherein the first adhesive sealant is chosen from a group consisting of 3 Bond 184, 3 Bond 51, Norland 68, Silicone E 17303, 3 Bond 98, Loctite 395 and 3 Bond 96.

4. The compressive seal of claim 1, wherein a temperature necessary for curing the second adhesive sealant is less than about 70° C.

5. A liquid crystal display assembly comprising:

a transparent plate;

a die having a pixel array disposed on a first side thereof; and a compressive seal adhesively coupling the transparent plate with the first side of the die, and configured to contain a quantity of liquid crystal material disposed between the transparent plate and the pixel array, said compressive seal including a compressible first adhesive sealant disposed substantially peripherally around the liquid crystal material between the transparent plate and the die of the liquid crystal display assembly and a second adhesive sealant disposed substantially peripherally around said first adhesive sealant and adapted to compress the first adhesive sealant and the quantity of liquid crystal material between the transparent plate and the die when said second adhesive sealant is exposed to heat wherein said second adhesive sealant substantially prevents said first adhesive sealant from expanding such that contact of the liquid crystal material with both the transparent plate and the die is maintained.

6. The liquid crystal display assembly of claim 5, wherein a temperature necessary for curing the second adhesive sealant is less than about 70° C.

7. A process for manufacturing a liquid crystal display assembly having a transparent plate and a die with a pixel array disposed on a first side, the process comprising:

applying a compressible first adhesive sealant to the transparent plate and the first side of the die, such that the first adhesive sealant is essentially between and adhesively couples the transparent plate with the first side of the die so as to define an associated interior volume of the liquid crystal display assembly;

introducing a quantity of liquid crystal material into the associated interior volume;

applying a second adhesive sealant to the first adhesive sealant, said second adhesive sealant substantially peripherally surrounding said first adhesive sealant; and heating said second adhesive sealant wherein the second adhesive sealant is configured to compress the first adhesive sealant and the quantity of liquid crystal material between the transparent plate and the die when said second adhesive sealant is exposed to heat wherein said second adhesive sealant substantially prevents said first adhesive sealant from expanding such that contact of the liquid crystal material with both the transparent plate and the die is maintained.

8. The process of claim 7, wherein a temperature necessary for curing the second adhesive sealant is less than about 70° C.

9. The process of claim 7, wherein a temperature necessary for curing the first adhesive sealant is less than about 70° C.

10. The process of claim 7, wherein the first adhesive sealant serves as a barrier between the second adhesive sealant and the quantity of liquid crystal material.

11. The process of claim 10, wherein the first adhesive sealant is chosen from a group consisting of 3 Bond 184, 3 Bond 51, Norland 68, Silicone E 17303, 3 Bond 98, Loctite 395 and 3 Bond 96.

12. The process of claim 7, wherein the first adhesive sealant is chosen from a group consisting of 3 Bond 184, 3 Bond 51, Norland 68, Silicone E 17303, 3 Bond 98, Loctite 395 and 3 Bond 96.

* * * * *